Dec. 1, 1931.  R. W. STEM  1,833,921
FURNACE CONTROL
Filed Dec. 23, 1930
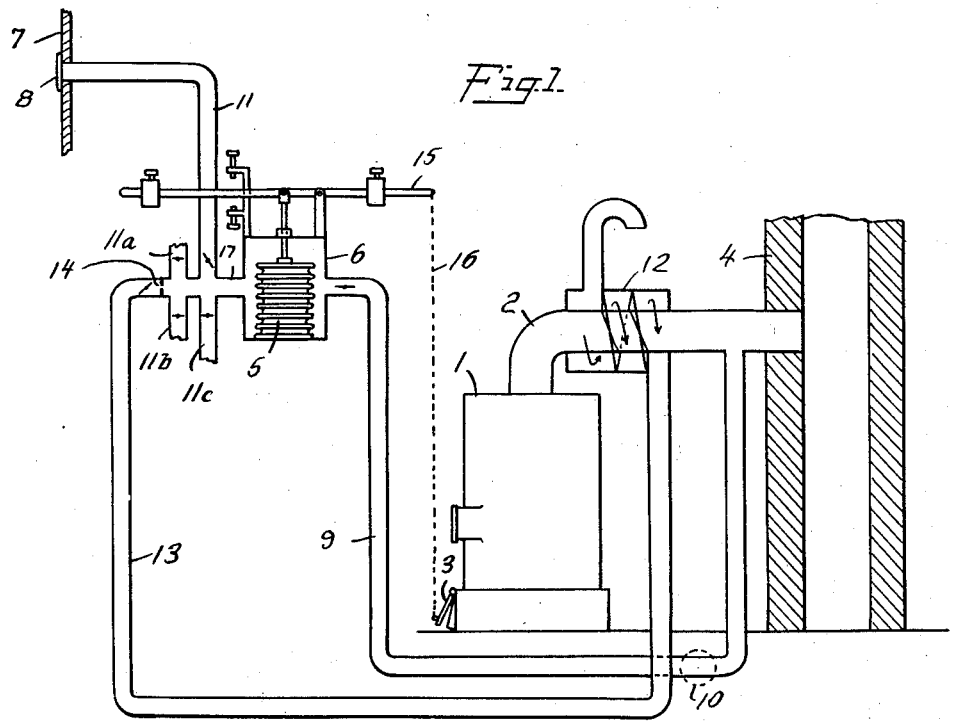
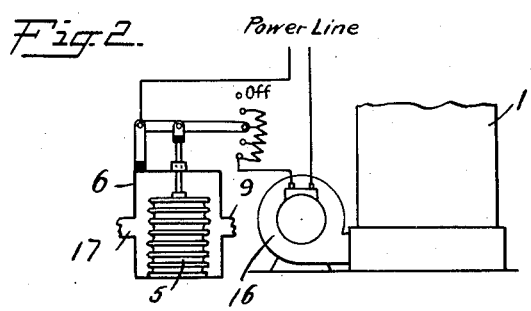
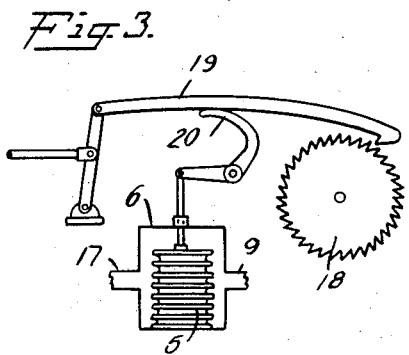
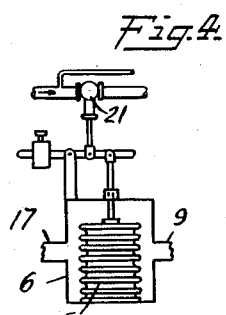
INVENTOR
Russell W. Stem
BY
Pennie, Davis, Marvin & Edwards
ATTORNEYS Patented Dec. 1, 1931

1,833,921

UNITED STATES PATENT OFFICE

RUSSELL W. STEM, OF BETHLEHEM, PENNSYLVANIA

FURNACE CONTROL

Application filed December 23, 1930. Serial No. 504,267.

This invention relates to improvements in the thermostatic control of furnaces used for heating houses, offices, shops and other buildings and the like. The invention is of special value and application in connection with the use of solid fuels such as coal and coke, and in the burning of gaseous fuels such as natural and manufactured gas, but it also has certain advantages in the burning of liquid fuels such as oil.

In certain aspects this invention relates to improvements upon the invention described in my application filed October 17, 1930, Serial Number 489,322.

In conventional practice a thermostat actuated by the temperature in the enclosed space to be heated is arranged to initiate, or to accelerate or promote, combustion in the furnace when the temperature in this space falls below a predetermined minimum limit and to stop, or to retard or inhibit, combustion in the furnace when the temperature in this space rises above a predetermined maximum limit. While the results so obtained are fairly satisfactory with respect to control of the temperature in that part of the enclosed space to be heated in which the thermostat is arranged, within the limits of the thermostats used, this practice disregards several elements essential to efficient operation of the furnace and is subject to the limits of a single thermostat arranged in one part of the enclosed space to be heated.

The present invention provides an improved thermostat arrangement which has several important advantages. The invention includes an improved thermostat arrangement by which the several factors determining the temperature in the enclosed space to be heated and the efficiency of operation of the furnace are correlated to adjust each with respect to the others to secure satisfactory temperature regulation and at the same time to promote efficiency of operation.

The invention will be further described in connection with the accompanying drawings which illustrate, diagrammatically and conventionally, several embodiments of the invention. In the drawings, Fig. 1 illustrates an embodiment of the invention embodying damper control, Fig. 2 illustrates an embodiment of the invention embodying control of motor driven means for effecting combustion, Fig. 3 illustrates an embodiment of the invention embodying stoker control, and Fig. 4 illustrates an embodiment of the invention embodying control of the rate of fuel supply. It is intended and will be understood that the accompanying drawings are intended merely to illustrate the invention and that they are not to be interpreted in any limiting sense.

Figure 1 of the accompanying drawings illustrates a heating furnace 1 which comprises the usual fire-box in which fuel is burned, heat transferring surfaces over which the hot products of combustion from the fire-box pass for the transfer of heat to the heating medium, air, water or steam for example, used in the heating system and a stack flue 2 communicating with a chimney 4 through which the hot gases from the fire-box which have passed over the heat transferring surfaces escape. A conventional damper for controlling the admission of air to the fire-box through a grate on which coal or coke, for example, is burned is shown at 3.

Instead of being arranged in the space to be heated, as in conventional practice, the thermostat responsive to the temperature in the enclosed space to be heated, the thermostat 5, is arranged in a thermostat chamber 6 appropriately insulated, thermally, and remotely situated with respect to the enclosed space to be heated, a room 7 in a building for example, which is connected to one or more pilot orifices such as pilot orifice 8 in the enclosed space to be heated so that a flow of air is maintained from the enclosed space to be heated through the orifice 8 and thence through the chamber 6.

According to the present invention, a flow of a gaseous medium the temperature of which reflects the temperature of the gases escaping through the stack flue is also maintained through the chamber 6 and the relative rates of flow of such air and of this gaseous medium through the chamber 6 are proportioned to give each of these factors its correct weight in establishing the mean temperature in the chamber 6 to which the thermostat 5 responds. The flow of air and of this gaseous medium through the chamber 6 is maintained, in the embodiment illustrated, by means of connection 9 between the chamber 6 and the chimney 4. A fan or blower or the like, as indicated at 10, may be provided to assist in maintaining this flow if the pressure differential provided by the chimney is irregular or insufficient.

The chamber 6 may be made to integrate temperatures in a plurality of enclosed spaces to be heated by connection to pilot orifices similar to pilot orifice 8 arranged in each of them through connections corresponding to connection 11, such as 11a, 11b, 11c, etc., and the relative weights of the temperatures prevailing in each of such a plurality of enclosed spaces with respect to the operation of the thermostat 5 may be proportioned by valves or dampers as illustrated in the several connections. The gaseous medium, the temperature of which reflects the temperature of the gases escaping through the stack flue 2, may consist of air drawn through the heat exchanger 12 arranged about the stack flue 2 and supplied to the chamber 6 from the heat exchanger 12 through connection 13. The arrangement of the thermostat chamber away from the enclosed space to be heated as just described is described in my prior application above mentioned. This arrangement of the thermostat chamber 6 is particularly advantageous in conjunction with the present invention since it enables the use of a thermostat large enough itself to develop the power required to operate, for example, a damper control. The thermostat proper arranged within the thermostat chamber may consist, for example, of a bellows partially filled with a working medium such as di-ethyl ether.

Again referring to Fig. 1 of the accompanying drawings, by proportioning the relative rates of flow of air from the enclosed space to be heated and of the gaseous medium the temperature of which reflects the temperatur of gases escaping through the furnace stack through the chamber 6, the mean temperature in the thermostat chamber 6 can be made representative of an integration of these temperatures in which each of the several factors involved is given its proper weight. Thus, since the thermostat 4 responds to this mean temperature, this integration of these factors, rather than any one of them, is made to govern the control of the furnace. For example, a decrease in the temperature of the enclosed space to be heated tends to increase the rate of combustion in the furnace and an increase in the temperature of the gases escaping through the furnace stack tends to decrease the rate of combustion in the furnace but in accordance with this invention each of these factors operates with respect to control of the furnace with reference to the other and they are correlated to secure satisfactory temperature regulation and at the same time to promote efficiency of operation.

This proportioning of the relative rates of flow of the air and of the gaseous medium reflecting the temperature of the stack gases may be accomplished in a variety of ways. It may be accomplished, for example, by correctly proportioning the diameters of the tubing used for the several connections with respect to the lengths of such tubing. Or it may be accomplished, for example, by means of adjustable dampers in the several connections. In general, it is advantageous to include a limiting orifice, as indicated at 14 in Fig. 1, in the connection through which the gaseous medium reflecting the temperature of the stack gases is supplied to the thermostat chamber because of the usually relatively high temperature of this gaseous medium. The temperature of this gaseous medium as it enters the thermostat chamber, however, may be much lower than the temperature of the stack gases, because of limited heat exchange between this gaseous medium and the stack gases or because of cooling of this gaseous medium on its way to the thermostat chamber for example.

The connections 11, 11a, 11b and 11c may be of any material reasonably air-tight and adapted to withstand the temperatures attained in the heat exchanger 12, and either should be arranged so that heat losses from it are reasonably constant or should be thermally insulated.

In the embodiment illustrated in Fig. 1 of the accompanying drawings, the thermostat 5 operates the damper 3 through the linkage including a lever 15 and a chain 16, the linkage being arranged so that a decrease in the mean temperature in the thermostat chamber 6 tends to open the damper 3 and increase in the mean temperature in the thermostat chamber 6 tends to close the damper 3. The further figures of the drawings illustrate examples of applications of the invention to other types of furnace control. The same reference characters are used to designate the same or corresponding parts in the several figures.

Figure 2 of the accompanying drawings illustrates a heating furnace comprising motor driven means 16 for effecting combustion, a blower for example, controlled by a rheostat 17 connected to the thermostat 5 arranged in the thermostat chamber 6 through appropriate linkage adapted to increase and decrease the rate of operation of the motor driven means 16 as the mean temperature in the thermostat chamber 6 decreases and increases respectively. A thermostat chamber 6 is arranged as in Fig. 1, being connected to the corresponding connections designated 9 and 17. Fig. 3 of the accompanying drawings illustrates an application of the invention to control of a mechanical stoker, the stoker feed mechanism being driven from a ratchet wheel 18 in turn driven by an oscillating pawl 19, the effective travel of the pawl in engagement with the ratchet wheel being increased and decreased as the mean temperature in the thermostat chamber 6 decreases and increases respectively by means of the cam 20 actuated by the thermostat 5. Fig. 4 of the accompanying drawings illustrates an application of the invention to control of a gas fired furnace, the thermostat 5 being connected to a throttle valve 21 so as to open and close this throttle valve as the mean temperature in the thermostat chamber 6 decreases and increases respectively. The mode of application of the invention in connection with various types of furnace control will be apparent from these examples.

I claim:

1. An improved heating furnace control comprising a thermostat chamber, means for maintaining a flow of air from an enclosed space to be heated through said chamber, means for maintaining a flow of a gaseous medium the temperature of which reflects the temperature of the gases escaping through the furnace stack through the same said chamber, means for proportioning the relative rates of flow of said air and of said gaseous medium through said chamber, and temperature responsive means adapted to control said furnace arranged in said chamber.

2. An improved heating furnace control comprising a thermostat chamber, means for maintaining a flow of air from an enclosed space to be heated through said chamber, means for maintaining a flow of a gaseous medium the temperature of which reflects the temperature of the gases escaping through the furnace stack through the same said chamber, means for proportioning the relative rates of flow of said air and of said gaseous medium through said chamber, and temperature responsive means adapted to increase the rate of supply of fuel for combustion in said furnace as the mean temperature in said chamber decreases and to decrease said rate of supply as said mean temperature increases.

3. An improved heating furnace control comprising a thermostat chamber, means for maintaining a flow of air from an enclosed space to be heated through said chamber, means for maintaining a flow of a gaseous medium the temperature of which reflects the temperature of the gases escaping through the furnace stack through the same said chamber, means for proportioning the relative rates of flow of said air and of said gaseous medium through said chamber, and temperature responsive means adapted to increase the rate of supply of air for combustion in said furnace as the mean temperature in said chamber decreases and to decrease said rate of supply as said mean temperature increases.

In testimony whereof I affix my signature.

RUSSELL W. STEM.